United States Patent [19]

Nagumo et al.

[11] Patent Number: 4,527,191
[45] Date of Patent: Jul. 2, 1985

[54] DIGITAL SIGNAL PROCESSING CIRCUIT

[75] Inventors: Fumio Nagumo; Takashi Asaida, both of Atsugi, Japan

[73] Assignee: Sony Corporation, Tokyo, Japan

[21] Appl. No.: 465,053

[22] Filed: Feb. 9, 1983

[30] Foreign Application Priority Data

Feb. 10, 1982 [JP] Japan .................................. 57-19973

[51] Int. Cl.³ ........................................... H04N 9/539
[52] U.S. Cl. ..................................................... 358/30
[58] Field of Search ......................... 358/13, 21 R, 30; 364/768, 784

[56] References Cited

U.S. PATENT DOCUMENTS

4,438,452 3/1984 Powers .................................. 358/13

Primary Examiner—Richard Murray
Attorney, Agent, or Firm—Hill, Van Santen, Steadman & Simpson

[57] ABSTRACT

A digital signal processing circuit, for example, a digital signal adder circuit suitable for use in a digital color encoder for generating a digital composite color video signal from three digital primary color signals. At least two input digital signals are respectively supplied to a signal delay circuit which generates the digital signal in the form of skew bits wherein the higher bit is given a larger delay. The output signals of the signal delay circuit are supplied to an adder circuit in which the small number of bits of the digital signals are added during one clock interval. And, the output signal of the adder circuit is supplied to a further delay circuit which generates a digital signal in the form of linear bits wherein any bit in originally the same clock interval is given the same delay.

11 Claims, 15 Drawing Figures

| $I_0$ | $Q_0$ | $-I_0$ | $-Q_0$ |

FIG. 4B

| $-Q_1$ | $I_1$ | $Q_1$ | $-I_1$ |

FIG. 4C

| $-I_2$ | $-Q_2$ | $I_2$ | $Q_2$ |

DIGITAL SIGNAL PROCESSING CIRCUIT

BACKGROUND OF THE INVENTION

1. Field of the Invention

This invention relates generally to a digital signal processing circuit and more particularly is directed to a digital signal processing circuit in which the processing speed is lowered.

2. Description of the Prior Art

In the existing digital signal processing circuit, particularly the digital adder circuit in which at least two input digital signals are added together, a so-called fast carry type full adder system is used. This type of adder system is suitable for handling the digital signal with the small number of bits and the high frequency clock rate because this type of adder system is very high in processing speed, but this type of adder system can not be applied to a circuit for handling the digital signal with the large number of bits, for example, 8-bit digital signal because the number of the circuit elements is exponentially increased with the increase of the number of bits. Another type of adder system is a so-called ripple carry type full adder system in which a plurality of full adders, each of which is suitable for handling the relatively small bits, is operated time sequentially. Therefore, in this type of adder system, each full adder must be operated at a relatively fast speed when the clock frequency is high. So, the circuit element or base logic forming each of the full adders must be a high speed logic element, such as transistor-transistor logic (TTL) or emitter-coupled-logic (ECL) which are not suitable for increasing the integrating density and for decreasing the power consumption. And, the logic element, such as complementary metal oxide semiconductor (CMOS) which is a relatively low speed logic but suitable for increasing the integrating density and for decreasing the power consumption can not be applied, too.

Recently, it has been proposed that the signal processing circuit for a color signal encoder is made in a digital fashion. In such a digital encoder, the sampling frequency that is the clock frequency, must be selected fairly high, such as 3fsc or 4fsc, where fsc is the frequency of the subcarrier, to increase the resolution of the video signal and to decrease the aliasing distortions and the number of bits must be selected large enough to obtain the sufficient gradation of the picture. But, the large part of the digital color encoder is formed of the digital adder circuits, for example, a matrix circuit, a Y/C mixing circuit etc. Therefore, in the digital color encoder, it is very difficult to use the above mentioned type of adder system.

OBJECTS AND SUMMARY OF THE INVENTION

Accordingly, it is an object of the present invention to provide an improved digital signal processing circuit free from the above mentioned defects inherent in the prior art system.

Another object of the present invention is to provide a digital adder circuit in which the processing speed is relatively low.

Further object of the present invention is to provide a digital adder circuit suitable for being applied to a digital color encoder for generating a digital composite color video signal.

Still further object of the present invention is to provide a digital adder circuit to which a logic element, such as a complementary metal oxide semiconductor (CMOS) suitable for increasing the integrating density and for decreasing the power consumption can be applied.

According to an aspect of the present invention, at least two digital signals are supplied to first and second delay means and converted to digital signals in the form of skew bits, and the output signals of the first and second delay means are supplied to adder circuits. The outputs of the adder circuits are supplied to a third delay means and then converted to the digital signal in the form of linear bits.

The other objects, features and advantages of the present invention will become apparent from the following description taken in conjunction with the accompanying drawings through which the like references designate the same elements and parts.

DESCRIPTION OF THE PREFERRED EMBODIMENTS

Referring to the attached drawings, this invention will be described hereinafter. Before describing a digital signal processing circuit according to this invention, delay means or delay circuits used in this invention will be described first. In the present invention, delay means is adapted to delay bits of one word in such a manner that the higher bit thereof is given a larger amount of delay. Consider now one word formed of 8 bits and the addition of one bit performed during one clock period or interval. Delay circuits shown in FIGS. 1A and 1B will be used in combination for such purpose. Let a least-significant bit (LSB) be represented as $A_0$, upper bits of the LSB as $B_0$, $C_0$, $D_0$, $E_0$, $F_0$, $G_0$ and $H_0$ (which is taken as a most-significant bit (MSB)), and one clock interval as d. Then, these bits are respectively given delays which are decreased in delay amount from $H_0$ to the lower bits sequentially such as 7d, 6d, 5d, 4d, 3d, 2d, d, and 0, and then delivered to their output sides. These bits appearing at the output sides are represented as $A_0$, $B_1$, $C_2$, $D_3$, $E_4$, $F_5$, $G_6$ and $H_7$ respectively. While, FIG. 1B shows another delay circuit opposing the aforenoted delay circuit of FIG. 1A in which the lower bits are given a larger delay sequentially and thereby the delays imparted to the respective bits as described above are cancelled out. When supplied at its input sides with 8 bits, $A_0, B_1, C_2, \ldots, H_7$, this delay circuit produces at its output sides 8 bits, $A_7$ to $H_7$ which constitute the original one word. For the delay circuit by which each bit is delayed by a predetermined amount of delay, a shift register or random-access memory (RAM) can be used.

Figure 1A:
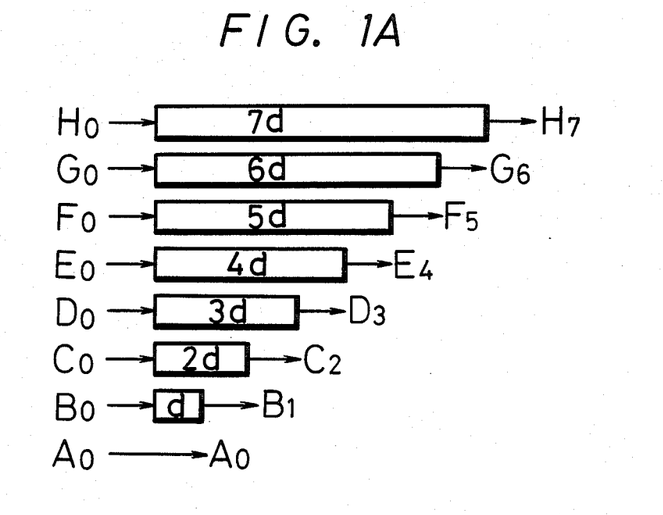
FIGS. 1A and 1B are schematic block diagrams used to explain a delay circuit and a reverse delay circuit used in this invention.
Figure 1B:
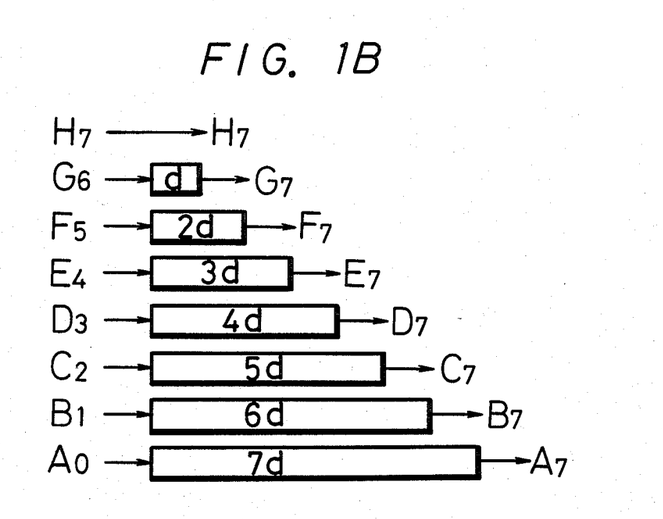
Figure 2:
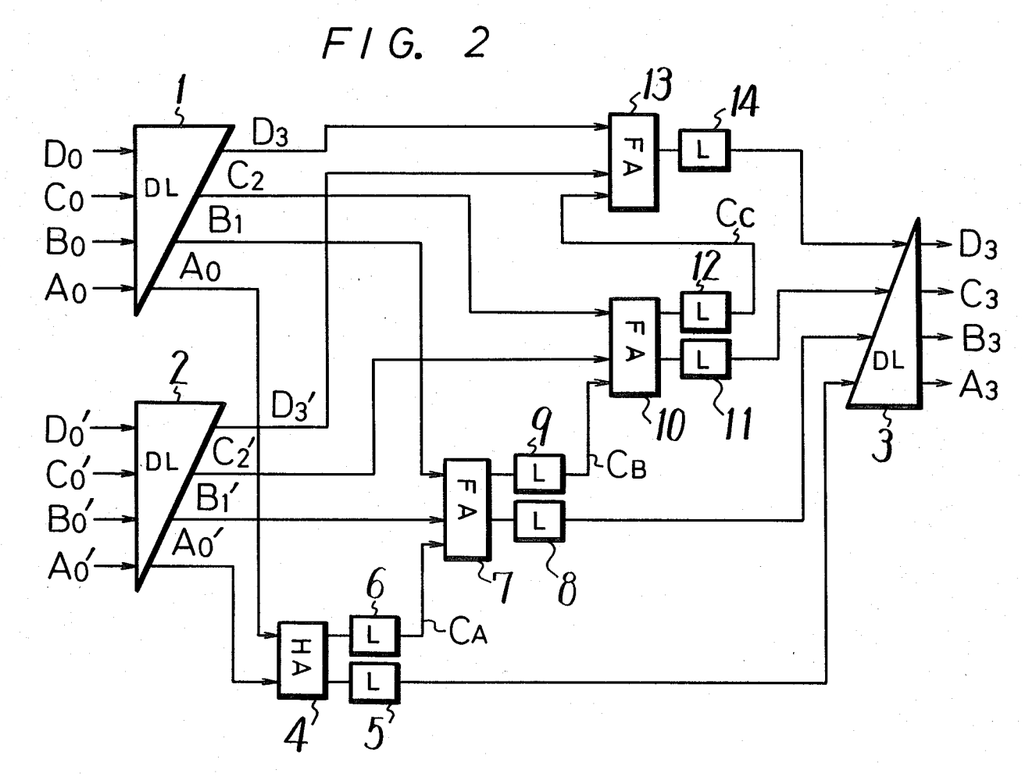
FIG. 2 is a schematic block diagram showing a fundamental digital adder circuit including a delay circuit and a reverse delay circuit according to this invention.

FIG. 2 illustrates an example of fundamental circuitry of an adder circuit having the aforenoted delay circuits in which one word is formed of 4 bits for the sake of brevity. In FIG. 2, reference numerals 1 and 2 designate delay circuits, each being operable such that the higher bit is given a larger delay amount, similarly to that shown in FIG. 1A, and numeral 3 designates a delay circuit which operates contrariwise in such a way that the lower bit is given a larger delay amount similarly to that shown in FIG. 1B. Data $A_0$ to $D_0$ and $A'_0$ to $D'_0$, each formed of 4 bits, are respectively supplied to these delay circuits 1 and 2 in which they are delayed by $3d$, $2d$, $d$ and 0 and then developed at their output sides. Each of the incoming data is provided in the form of successive words, each word formed of parallel 4 bits. Noticing just one word thereof, the LSB bits, $A_0$ and $A'_0$, each of which is the first outgoing bit, are supplied to a half adder 4. The output and the carry from this half adder 4 are respectively supplied to latch circuits 5 and 6 and latched therein. The latch circuits 5 and 6 and subsequent latch circuits are adapted to operate at a clock with a frequency equal to the transmission rate of data. The output from the latch circuit 5 is supplied to the delay circuit 3 which operates such that the lower bit is given the larger delay similarly to that shown in FIG. 1B. The delay circuits 1, 2 and 3 are adapted to operate at a drive clock with a frequency same as the transmission rate of data.

The outputs $B_1$ and $B'_0$ of the delay circuits 1 and 2 and the carry $C_A$ from the latch circuit 6 are supplied to a full adder 7. The output and the carry from the full adder 7 are respectively fed to latch circuits 8 and 9. Subsequently, the output from the latch circuit 8 is supplied to the delay circuit 3 and the carry $C_B$ from the latch circuit 9 is supplied to a full adder 10. With the same timing as that mentioned just above, the full adder 10 is supplied with the bits, $C_2$ and $C'_2$ from the delay circuits 1 and 2, and its output and carry are respectively supplied to latch circuits 11 and 12. The output of the latch circuit 11 is supplied to the delay circuit 3 and the carry $C_C$ from the latch circuit 12 is supplied to a full adder 13. Since this full adder 13 is supplied with the bits $D_3$ and $D'_3$ from the delay circuits 1 and 2 in the same timing as that of the carry $C_C$ supplied thereto, its output is supplied to the delay circuit 3 via a latch circuit 14. 4 bits, $A_3$ to $D_3$, developed as the outputs of the delay circuit 3 result from additions of the bits, $A_0$ to $D_0$ and $A'_0$ to $D'_0$. In this way, it is sufficient that each of the half adder 4 and the full adders 7, 10 and 13 performs its addition in one clock interval of the data rate. Therefore, even when the incoming data rate is 4fsc, where fsc is a color subcarrier, as high as a chrominance signal, the aforenoted adders can be formed of metal oxide semiconductor integrated circuit (MOSIC).

Figure 3:
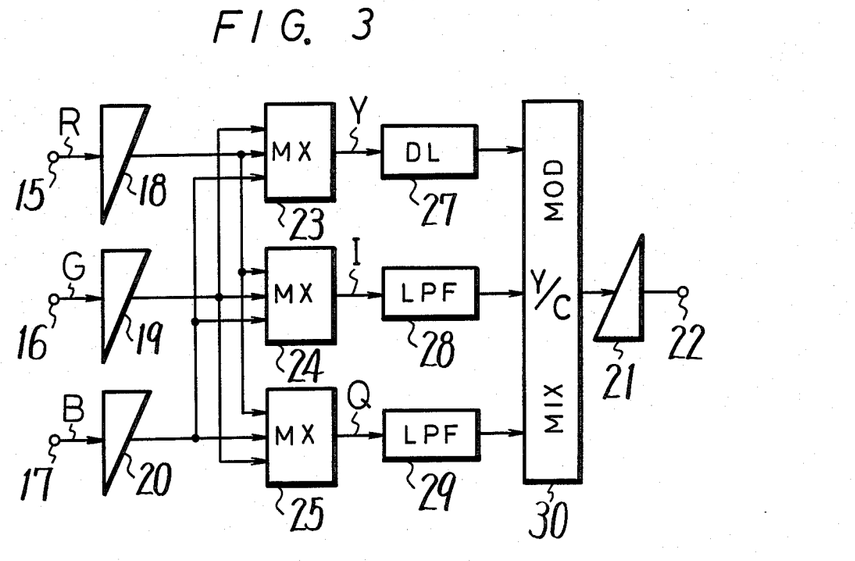
FIG. 3 is a block diagram showing an example of the invention.

Now, an embodiment of a digital signal processing circuit according to the present invention will hereinafter be described with reference to the drawings, particularly FIG. 3. In FIG. 3, reference numerals 15, 16 and 17 respectively denote input terminals to which are supplied R(red) signal, G(green) signal and B(blue) signal with data rate of 4fsc and each word being formed of 8 bits. They are respectively supplied through delay circuits 18, 19 and 20 to matrix circuits 23, 24 and 25. In this case, each of the R signal, the G signal and the B signal is generated from an image pickup element or image sensor such as a charge-coupled device (CCD) and so on and then undergoes $\gamma$(gamma)-correction. Due to the nonlinear characteristic, the $\gamma$-correction circuit can not be connected between any one of the delay circuits 18, 19 and 20 and a delay circuit 21 which delay circuit 21 operates contrariwise for the delay circuits 18, 19 and 20. To an output terminal 22 of the delay circuit 21 is developed a digital composite color video signal.

The matrix circuits 23, 24 and 25 respectively generate a Y (luminance) signal and two color difference signals (I signal and Q signal). In general, the matrix circuits 23, 24 and 25 perform the calculations on the basis of i-th word as:

$$Y_i = 0.30\ R_i + 0.11\ B_i + 0.59\ G_i$$

$$I_i = 0.60\ R_i - 0.32\ B_i - 0.28\ G_i$$

$$Q_i = 0.21\ R_i + 0.31\ B_i - 0.52\ G_i$$

These calculations are usually carried out by a read-only memory (ROM), making effective use of a look-up table. But, since the above equations are approximated, the weighting is made possible by the adding process. For instance, the above equation concerning the Y signal can be approximated to the equation as given by:

$$Y_i = \frac{1}{64} (20\ R_i + 7\ B_i + 38\ G_i)$$

$$= \frac{1}{64} \{(16 + 4)\ R_i + (8 - 1)\ B_i + (32 + 4 + 2)G_i\}$$

Figure 5:
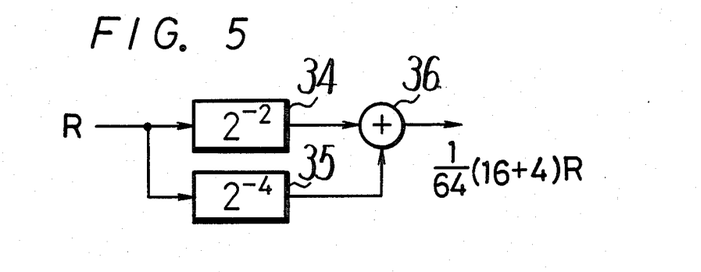
FIG. 5 is a block diagram showing an example of a part shown in FIG. 3.

In this equation, the calculation of $1/64(16+4)R_i$ can be carried out by such a circuit construction that, as shown in FIG. 5, $2^{-2}$-multiplier 34 and $2^{-4}$-multiplier 35 are used and the outputs from both the multipliers 34 and 35 are supplied to an adder circuit 36. In this adder circuit 36, the adding process is performed in each clock interval per one bit similarly to the adder circuits shown in FIG. 2. The other matrix circuits 24 and 25 are adapted to operate similarly and each of their outputs is such that the higher bit of one word is given the larger delay.

The Y signal, the I signal and the Q signal delivered from the matrix circuits 23, 24 and 25 are respectively supplied to a delay circuit 27 and low-pass filters 28 and 29. The low-pass filters 28 and 29 are both formed of digital filters, suppressing the band of the I signal to 1.5 MHz and that of the Q signal to 0.5 MHz respectively. The delay circuit 27 has the amount of delay equal to that imparted to each of the I signal and the Q signal by the low-pass filters 28 and 29, and is used in the matching of phases. The low-pass filters or digital filters 28 and 29 are formed such that the outputs from the delay circuits 19 and 20, the input and output from the delay circuits and the signals from a respective stage are weighted with a predetermined amount and added together, for example, of a finite-impulse response (FIR) type. Their circuit constructions for enabling the above weighting are similar to that of the aforenoted matrix circuit.

Figure 4A:
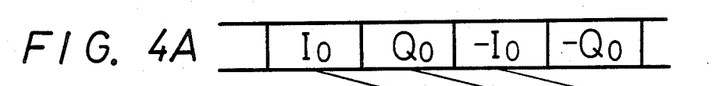
FIGS. 4A to 4C are respectively timing charts useful for explaining the example shown in FIG. 3.
Figure 4B:
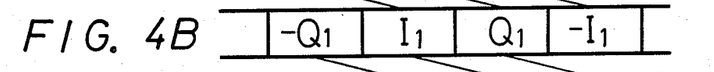
Figure 4C:
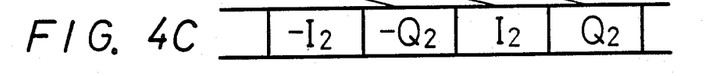

The Y signal from the delay circuit 27 and the I signal and the Q signal from the low-pass filters 28 and 29 are supplied to a modulating and Y/C mixing circuit 30 in which the I signal and the Q signal are digitally modulated and then the modulated color difference signals are made as the Y signal. In the digital modulation, one of the I signal and Q signal with the data rate of 4fsc is alternately selected and the polarities thereof are changed at ½fsc. In other words, the I signal and the Q signal are converted such that 4 words, I, Q, −I and −Q are sequentially contained in each cycle of 1/fsc. In this case, since 8 bits of one word are delayed sequentially in timing by being passed through the delay circuits 18, 19 and 20, upon digital modulation, the selecting timing of the I signal and the Q signal is delayed at each bit and the phase with which the polarity is changed is also delayed. FIGS. 4A to 4C illustrate the color difference signals, namely, the I signal and the Q signal, each being modulated in the digital fashion. FIG. 4A shows the LSB bits, FIG. 4B the bits higher than the LSB bits and FIG. 4C the bits yet higher than the preceding higher bits of FIG. 4B. Although not shown, in 5 bits higher than the aforesaid bits, each phase thereof at which the polarity of bit is changed is given a larger delay by one bit each for the higher bit. 8 bits delayed by one word each and shown by straight lines in FIGS. 4A to 4C constitute one word of the I signal and the Q signal. The Y/C mixer in the modulating and Y/C mixing circuit 30 for adding the Y signal with the digital-modulated color difference signals is constructed same as the adder circuits shown in FIG. 2. The output from the modulating and Y/C mixing circuit 30 is supplied to the opposing delay circuit 21 and thus at the output terminal 22 led out therefrom appear parallel-8 bits corresponding to one word.

While in the embodiment of this invention as set forth above, the digital modulation of 4fsc is carried out, another embodiment of this invention will be described with reference to FIG. 6. This embodiment, unlike the foregoing embodiment, is applied to a digital color encoder capable of the digital modulation of 3fsc.

Figure 6:
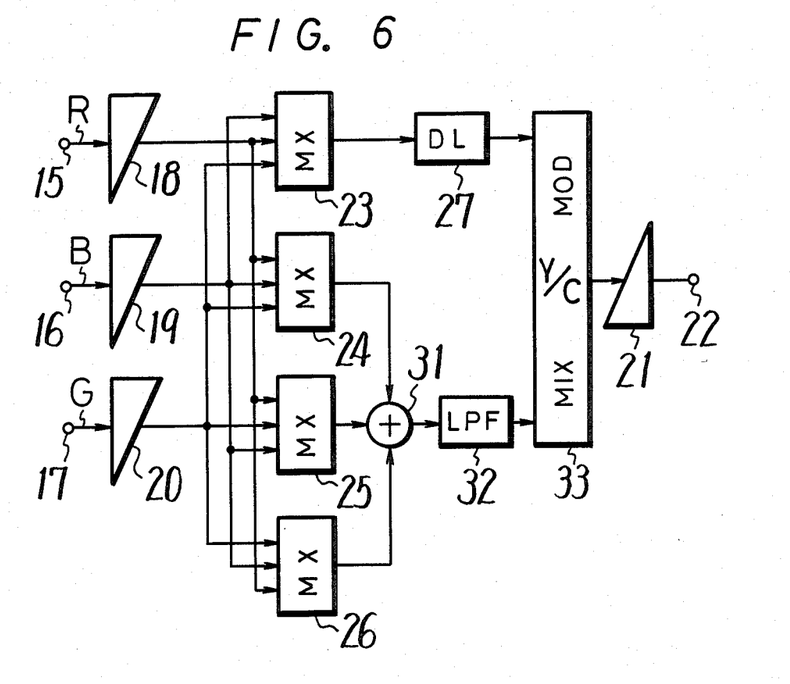
FIG. 6 is a block diagram showing another embodiment of the present invention.

In FIG. 6, numerals 15, 16 and 17 denote input terminals to which are supplied R signal, G signal and B signal, each having the data rate, 3fsc. A matrix circuit 23 is adapted to generate a Y signal and other matrix circuits 24, 25 and 26 are adapted to generate color difference signals, namely, U signal, V signal and W signal of data rate, fsc. In general, these three color difference signals are formed by the equations below:

$$U_i = -0.15\ R_i + 0.44\ B_i - 0.29\ G_i$$

$$V_i = -0.46\ R_i - 0.13\ B_i + 0.59\ G_i$$

$$W_i = 0.60\ R_i - 0.31\ B_i - 0.29\ G_i$$

Figure 7:
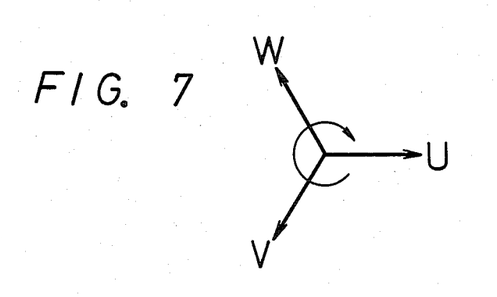
FIG. 7 is a vector representation of three color difference signals.
Figure 8A:
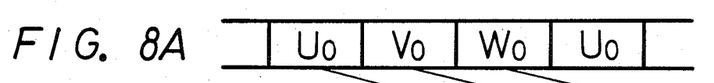
FIGS. 8A to 8C are respectively timing charts used to explain the same.
Figure 8B:
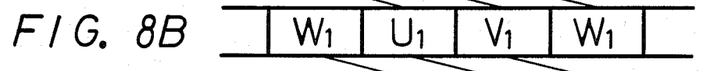
Figure 8C:
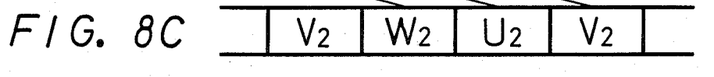

Similarly to the foregoing embodiment, each coefficient in the above equations can be approximated to a coefficient divided by an integer. Consequently, the calculations of the above equations can be made by the combination of a 2 divider circuit of power 2 and an adder circuit of power 2 similar to those of FIG. 5. The U signal, the V signal and the W signal each having the data rate of fsc are produced from these matrix circuits 24, 25 and 26 and then added, mixed or synthesized together in a mixer or adder circuit 31 thereby converted to a sequential color difference signal of 3fsc. The output from the adder circuit 31 is suppressed to the band of 0.5 MHz by a low pass filter 32 and then supplied together with the Y signal derived from a delay circuit 27 to a modulating and Y/C mixing circuit 33. As shown by a vector representation in FIG. 7, the color difference signals modulated by three phases are rotatable at the frequency, fsc and in the order of the signal U, the signal V and the signal W. As illustrated in FIG. 8A, compared with the LSB bits of the modulated color difference signals, the bits (FIG. 8B) higher than the LSB bits and the bits (FIG. 8C) yet higher than the preceding higher bits are sequentially delayed in phase by one bit each, and although not shown, the MSB bits are also sequentially delayed in phase by one bit each. The bits connected by straight lines in FIGS. 8A to 8C constitute one word. Subsequently, the output from the modulating and Y/C mixing circuit 33 is delivered through an opposing delay circuit 21 to an output terminal 22.

Figure 9A:
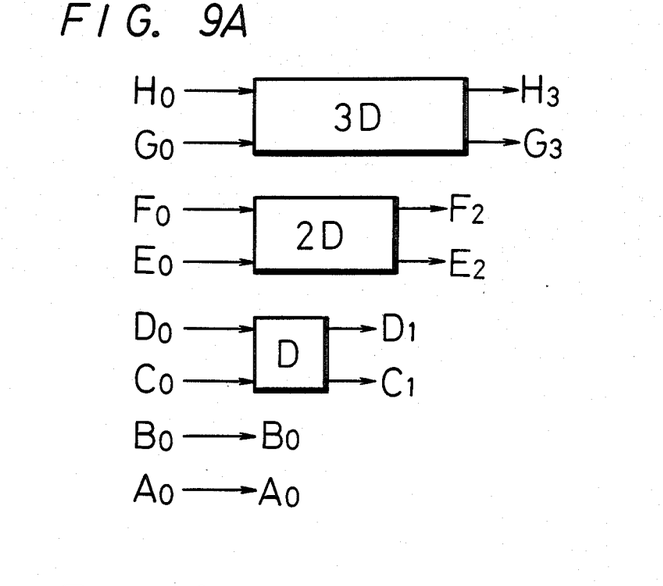
FIGS. 9A and 9B are respectively block diagrams useful in the explanation of another example of delay circuits used in this invention.
Figure 9B:
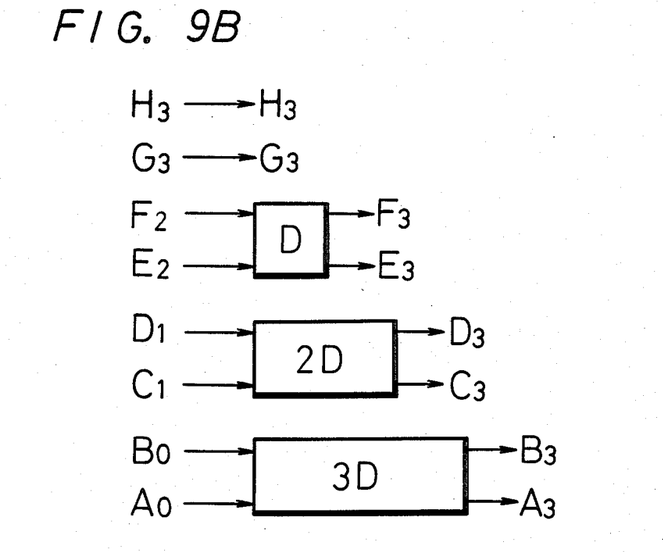

In the aforenoted embodiments, as, for example, shown in FIGS. 1A, 1B and FIG. 2, respective bits are delayed by different amounts of delay, that is, the bits higher than the MSB bits are delayed by one clock interval and the bits higher than the immediately preceding higher bits are delayed by two clock intervals and so on and then signal-processed. Besides the foregoing embodiments, it may be considered that the different delay amounts are imparted to every two bits and the signal-processing is carried out thereafter. This example will be described with reference to FIGS. 9A and 9B. FIGS. 9A and 9B respectively correspond to FIGS. 1A and 1B in which data supplied thereto in the form of successive words, each word being formed of 8 bits, namely, $A_0$ to $H_0$, are delayed for each bit by different amounts of delay, by way of example. As a delay means or circuits for this purpose, delay circuits shown in FIGS. 9A and 9B are combined together. Then, in FIG. 9A, neither the LSB bit, A nor the bit $B_0$, which is just higher than the LSB bit $A_0$, are delayed, but the higher bits, $C_0$ and $D_0$ are delayed by one clock interval D, the bits, $E_0$ and $F_0$ by 2D and the bits, $G_0$ and $H_0$ by 3D, which are then developed at the output sides of the delay circuits, respectively. The bits produced at the output sides are specified as $A_0$, $B_0$, $C_1$, $D_1$, $E_2$, $F_2$, $G_3$ and $H_3$, respectively. FIG. 9B shows the delay circuit for cancelling out the delays imparted to the respective bits $A_0$ to $H_3$ as mentioned before. When supplied at its input side with 8 bits, $A_0$, $B_0$, ..., $G_3$, $H_3$, this delay circuit produces at its output side 8 bits, $A_3$, $B_3$, ..., $G_3$, $H_3$. The 8 bits, $A_3$ to $H_3$ thus produced are inherently forming one word. If this delay circuit system is applied to the digital adder circuit according to this invention, each of the adder circuits must perform the addition of 2 bits in one clock interval, but there is an advantage that an overall delay amount can be reduced.

Furthermore, although not shown, it is possible that digital data of 8 bits is separated into the digital data of 4 bits, each data of 4 bits is delayed by different amounts of delay and then signal-processed.

As will be understood from the aforenoted embodiments, according to the present invention, since the data is modulated in a digital fashion so as to make the bits of one word be delayed by one or several bits, it is sufficient to perform the calculation of the bits such as addition and the like in the interval of one or several bits delay, enabling the processing speed of the calculation circuit to be lowered. Thus, even when the data having the high transmission rate such as 4fsc is processed, it becomes possible to use the logic element with high integrating density and small power consumption like CMOS.

Furthermore, since the processing between the delay circuits and the opposing delay circuit is made at a low speed as described above, if the delay circuits and the opposing delay circuit are similarly connected between the input sides of the matrix circuits and the output side of the Y/C mixing circuit, there is then an advantage that the parts of the circuit element operable at low speed can be increased.

The above description is given on the preferred embodiments of the invention, but it will be apparent that many modifications and variations could be effected by one skilled in the art without departing from the spirits or scope of the novel concepts of the invention, so that the scope of the invention should be determined by the appended claims only.

We claim as our invention:

1. A digital signal processing circuit for processing at least two digital signals comprising:
   (A) a first input terminal supplied with a first digital signal of parallel M bits per one clock interval where M is a positive integer;
   (B) a second input terminal supplied with a second digital signal of parallel N bits per one clock where N is a positive integer and may be equal to M;
   (C) first delay means for delaying said first digital signal such that, at least, the delay imparted to the most-significant bit (MSB) of said first digital signal is larger than that imparted to the least-significant bit (LSB) of said first digital signal by m clock intervals where m is a positive integer;
   (D) second delay means for delaying said second digital signal such that, at least, the delay imparted to the MSB of said second digital signal is larger than that imparted to the LSB of said second digital signal by n clock intervals where n is a positive integer;
   (E) an adder means for adding M/m+1 bits including the LSB of said first digital signal and N/n+1 bits including the LSB of said second digital signal and for generating output bits and a carry bit, the delay imparted to said M/m+1 bits and N/n+1 bits by said first and second delay means being the same;
   (F) L of full adder means where L is a positive integer, each of said full adder means adding bits of said first and second digital signals and a carry bit and generating output bits and a carry bit which are supplied to the succeeding full adder means, the delay imparted to said bits by said first and second delay means being the same, and one of said full adder means generating output MSB and generating at least the output bits; and
   (G) third delay means for delaying the output bits of said adder means and full adder means such that the output bits of said third delay means are all in the same original clock interval.

2. A digital signal processing circuit according to claim 1, wherein said first delay means delays each bit of said first digital signal such that the delay imparted to any bit is larger than that imparted to the adjacent lower bit by one clock interval, and said second delay means delays each bit of said second digital signal such that the delay imparted to any bit is larger than that imparted to the adjacent lower bit by one clock interval, thereby m equals M−1 and n equals N−1.

3. A digital signal processing circuit according to claim 1, further comprising other processing circuits including digital adder circuits, latch circuits and selector circuits between said adder means, full adder means and the third delay means or said first, second delay means and adder means, full adder means.

4. A digital signal processing circuit according to claim 3, wherein said first and second digital signals are two digital primary color signals, and further comprising third input terminal supplied with another digital primary color signal which is delayed by fourth delay means and which is processed with said two digital color primary color signals by said adder means, full adder means and other processing circuits, whereby the output of said third delay means being a digital composite color video signal.

5. A digital color encoder for generating a digital composite color video signal from three digital primary color signals comprising:
   (A) first, second and third input terminals to which said three digital primary color signals of parallel M bits per one clock interval are supplied where M is a positive integer;
   (B) first, second and third delay means connected to said first, second and third input terminals respectively, each of said delay means delaying each of said three digital primary color signals such that, at least, the delay imparted to the most-significant bit (MSB) of said three digital primary color signals is larger than that imparted to the least significant bit (LSB) by m clock intervals where m is a positive integer;
   (C) a first matrix circuit supplied with the output signals of said first, second and third delay means for generating digital color difference signals;
   (D) digital filter means for suppressing the bandwidth of said digital color difference signals;
   (E) modulating means for modulating a digital color subcarrier by said digital difference signals;
   (F) a second matrix circuit supplied with the output signals of said first, second and third delay means for generating a digital luminance signal;
   (G) mixing means for mixing said luminance signal with the output of said modulating means; and
   (H) fourth delay means for delaying each bit of the output signal of said mixing means such that the output bits of said fourth delay means are all in the same original clock interval.

6. A digital color encoder according to claim 5, wherein said first and second matrix circuits and said mixing means consist mainly of adder circuits.

7. A digital color encoder according to claim 5, wherein said first and second matrix circuits permit the output signals of said first, second and third delay means to be added with the different coefficients, said coefficients being approximated to the sum or difference of $1/2^n$ where n is 0 or a positive integer.

8. A digital color encoder according to claim 5, wherein the frequency of said clock is 4fsc where fsc is the frequency of the color subcarrier.

9. A digital color encoder according to claim 8, wherein said digital color difference signals are an I signal and a Q signal where $$I = 0.60\,R - 0.32\,B - 0.28\,G$$

$$Q = 0.21\,R + 0.31\,B - 0.52\,G$$

and said modulating means selects one of said I signal and Q signal alternately by one clock interval and changes the porarity at every two clock intervals.

10. A digital color encoder according to claim 5, wherein the frequency of said clock is 3fsc where fsc is the frequency of the color subcarrier.

11. A digital color encoder according to claim 10, wherein said digital color difference signals are U, V and W signals where $$U = -0.15\,R + 0.44\,B - 0.29\,G$$

$$V = -0.46\,R - 0.13\,B + 0.59\,G$$

$$W = -0.60\,R - 0.31\,B - 0.29\,G.$$

* * * * *